US011506950B2

United States Patent
Nakata et al.

(10) Patent No.: US 11,506,950 B2
(45) Date of Patent: Nov. 22, 2022

(54) OPTICAL WAVEGUIDE ELEMENT, OPTICAL WAVEGUIDE DEVICE AND OPTICAL TRANSMISSION APPARATUS

(71) Applicant: SUMITOMO OSAKA CEMENT CO., LTD., Tokyo (JP)

(72) Inventors: Yu Nakata, Tokyo (JP); Norikazu Miyazaki, Tokyo (JP)

(73) Assignee: SUMITOMO OSAKA CEMENT CO., LTD., Tokyo (JP)

( * ) Notice: Subject to any disclaimer, the term of this patent is extended or adjusted under 35 U.S.C. 154(b) by 26 days.

(21) Appl. No.: 17/202,288

(22) Filed: Mar. 15, 2021

(65) Prior Publication Data
US 2021/0294177 A1    Sep. 23, 2021

(30) Foreign Application Priority Data
Mar. 18, 2020   (JP) .............................. JP2020-047846

(51) Int. Cl.
  *G02F 1/21*   (2006.01)
  *G02F 1/225*  (2006.01)
  *G02F 1/035*  (2006.01)

(52) U.S. Cl.
  CPC ............ *G02F 1/212* (2021.01); *G02F 1/0356* (2013.01); *G02F 1/2255* (2013.01); *G02F 2201/063* (2013.01)

(58) Field of Classification Search
  None
  See application file for complete search history.

(56) References Cited

U.S. PATENT DOCUMENTS

| 9,046,703 | B2 * | 6/2015 | Fukuda ................. G02F 1/2257 |
| 9,817,293 | B2 * | 11/2017 | Hara .................... H01L 31/0232 |
| 2010/0239218 | A1 | 9/2010 | Sudou et al. |
| 2019/0285915 | A1 | 9/2019 | Shinozaki et al. |
| 2021/0294177 | A1 * | 9/2021 | Nakata ................... G02F 1/2255 |

FOREIGN PATENT DOCUMENTS

| JP | 2010224064 | | 10/2010 |
| JP | 2011075917 | | 4/2011 |
| JP | 2013080009 | A * | 5/2013 |
| JP | 2019159189 | | 9/2019 |

* cited by examiner

*Primary Examiner* — Rhonda S Peace
(74) *Attorney, Agent, or Firm* — JCIPRNET

(57) ABSTRACT

In an optical waveguide element which uses a rib type optical waveguide, light propagating in the rib type optical waveguide is monitored stably and accurately. The optical waveguide element includes a rib type optical waveguide provided on a optical waveguide substrate and configured of a convex portion protruding in a thickness direction of the optical waveguide substrate and extending in a plane direction of the optical waveguide substrate, and a light receiving element configured of a light receiving part formed on a light receiving element substrate disposed on the rib type optical waveguide and configured to receive at least a part of light propagating through the rib type optical waveguide, and the light receiving element substrate is supported by at least one first convex portion having the same height as that of the rib type optical waveguide provided on the optical waveguide substrate.

15 Claims, 13 Drawing Sheets

OPTICAL WAVEGUIDE ELEMENT, OPTICAL WAVEGUIDE DEVICE AND OPTICAL TRANSMISSION APPARATUS

CROSS REFERENCE TO RELATED APPLICATIONS

This application claims the priority benefit of Japanese Patent Application No. 2020-047846, filed on Mar. 18, 2020. The entirety of the above-mentioned patent application is hereby incorporated by reference herein and made a part of this specification.

TECHNICAL FIELD

The present disclosure relates to an optical waveguide element which is a functional element using an optical waveguide such as an optical modulation element, and an optical waveguide device using such an optical waveguide element.

DESCRIPTION OF RELATED ART

In a high-speed and large-capacity optical fiber communication system, optical transmission apparatus incorporating a waveguide type optical modulator are often used. Among them, an optical modulation element using $LiNbO_3$ (hereinafter, also referred to as LN) having an electro-optical effect as a substrate is widely used in the high-speed and large-capacity optical fiber communication system, because the optical modulation element using LN can realize wideband optical modulation characteristics with less optical loss as compared with an optical modulation device using a semiconductor material such as indium phosphide (InP), silicon (Si), or gallium arsenide (GaAs).

In response to the recent trend of increasing transmission capacity, modulation methods in optical fiber communication systems use mainly multi-level modulation such as quadrature phase shift keying (QPSK) or dual polarization-quadrature phase shift keying (DP-QPSK) or a modulation format in which polarization multiplexing is incorporated into the multi-level modulation.

On the other hand, the acceleration of spreading of Internet services in recent years has led to a further increase in communication traffic, and studies on further miniaturization, wider bandwidths, and lower power consumption in optical modulation elements are still in progress.

As one method for miniaturization, widening a bandwidth, and lower power consumption of such an optical modulation element, for example, an optical modulation element using a rib type optical waveguide (hereinafter, a rib type optical modulation element) is being studied (for example, refer to Patent Literature 1). The rib type optical waveguide is an optical waveguide in which an effective refractive index of a rib portion is made higher than that of other portions by processing a substrate made of LN (an LN substrate) such that it becomes thinner and further thinning other portions (for example, to a substrate thickness of 10 µm or less) while leaving a desired strip portion (a rib) by dry etching or the like.

On the other hand, in optical modulation elements, a light receiving element for monitoring an amount of light propagating in the optical waveguide of the optical modulation element is provided for the purpose of detecting a state of bias point variation according to a so-called drift phenomenon and/or for the purpose of controlling an amount of output modulated light.

As such an optical modulation element, there is a conventionally known one in which a light receiving element is provided on a portion at which an amount of light is to be observed in an optical waveguide formed by diffusing a high refractive index material into a substrate (refer to Patent Literature 2). In this optical modulation element, evanescent waves emitted from the optical waveguide is detected by the light receiving element by disposing a light receiving surface of the light receiving element formed on a small piece of a light receiving element substrate such as a semiconductor, such that the light receiving surface is close to the optical waveguide.

However, since a size of the light receiving element substrate on which the light receiving element is formed is several to several tens of times larger than a width of the above-described rib type optical waveguide, when the above-described conventional configuration is applied to an optical modulation element configured as a rib type optical waveguide as it is, the light receiving element cannot be stably held on the rib type optical waveguide. FIG. 13 is a diagram schematically showing this state. FIG. 13 shows a cross section of a surface of an optical waveguide substrate 1302, on which a rib type optical waveguide 1300 is formed, which is orthogonal to an extending direction of the rib type optical waveguide 1300. The optical waveguide substrate 1302 is supported by a support substrate 1310 such as glass. A light receiving element 1304 configured of a light receiving part 1308 formed on a light receiving element substrate 1306 is mounted on an upper portion of the rib type optical waveguide 1300. Thus, an intensity of light propagating through the rib type optical waveguide 1300 can be monitored by the light receiving element 1304.

Here, the light receiving element substrate 1306 is generally configured so that a width thereof (a width measured in a left-right direction in the drawing) is several to several tens of times larger than the width of, for example, the rib type optical waveguide 1300 (for example, the size of the light receiving element substrate is several hundred µm, while the width of the rib is about 1 µm). Therefore, a rotational moment centered on the rib type optical waveguide 1300 is generated in the light receiving element 1304, and the light receiving element 1304 may be tilted to the left on the rib type optical waveguide 1300 at the time of manufacture and/or due to deterioration over time, for example, as shown in the drawing. As a result, since the light receiving element 1304 and the rib type optical waveguide 1300 are not close to each other, sufficient evanescent waves are not input to the light receiving element 1304, and a monitoring sensitivity of the intensity of light becomes equal to or less than a permissible range. Further, when a temperature change occurs, a distance between the light receiving element 1304 and the rib type optical waveguide 1300 fluctuates, the monitor sensitivity fluctuates, and problems such as instability over time may occur.

Further, when the optical waveguide substrate 1302 is processed such that the optical waveguide substrate 1302 becomes as thin as having a thickness of about several µm as described above, not only stress may be generated in the rib type optical waveguide 1300, but also stress may be generated in a portion of the optical waveguide substrate 1302 corresponding to a peripheral portion of the rib type optical waveguide 1300, due to the light receiving element 1304 being tilted on the rib type optical waveguide 1300. As a result, mechanical damage such as cracking may occur in the optical waveguide substrate 1302 during manufacturing or over time.

Patent Literature 2 disclosures a technique in which, in an optical modulation element configured using an optical waveguide formed by diffusing a high refractive index material into a substrate, a pedestal for disposing a light receiving element is formed by diffusing the same high refractive index material in the vicinity of the optical waveguide in a predetermined pattern. However, although the configuration described in Patent Literature 1 is effective in a diffusion type optical waveguide, it does not provide a solution for stable arrangement of the light receiving element on the rib type optical waveguide as described above.

PATENT DOCUMENTS

[Patent Literature 1] Japanese Patent Laid-Open No. 2011-075917
[Patent Literature 2] Japanese Patent Laid-Open No. 2010-224064

SUMMARY

From the above-described background, in an optical waveguide element using a rib type optical waveguide, it is desired to realize a configuration capable of stably and accurately monitoring light propagating in the rib type optical waveguide.

According to an aspect of the disclosure, there is provided an optical waveguide element including a rib type optical waveguide provided on an optical waveguide substrate and configured of a convex portion protruding in a thickness direction of the optical waveguide substrate and extending in a plane direction of the optical waveguide substrate, and a light receiving element configured of a light receiving part formed on a light receiving element substrate disposed on the rib type optical waveguide and configured to receive a part of light propagating through the rib type optical waveguide, wherein the light receiving element substrate is supported by at least one first convex portion having the same height as that of the rib type optical waveguide provided on the optical waveguide substrate.

According to another aspect of the disclosure, at least one second convex portion may be provided on the optical waveguide substrate at input waveguide side of the light receiving part in a light propagation direction of the rib type optical waveguide.

According to another aspect of the disclosure, the second convex portion may extend in the plane direction of the optical waveguide substrate, and at both end portions thereof in an extending direction, a distance between one end portion facing the input waveguide side of the rib type optical waveguide and the rib type optical waveguide may be configured to be smaller than a distance between the other end opposite to the one end portion and the rib type optical waveguide.

According to another aspect of the disclosure, the second convex portion may have the same height as that of the rib type optical waveguide.

According to another aspect of the disclosure, at least one of the second convex portions may be the first convex portion which supports the light receiving element substrate.

According to another aspect of the disclosure, the rib type optical waveguide may terminate at a lower portion of a light receiving range of the light receiving part.

According to another aspect of the disclosure, the light receiving element may include a plurality of light receiving parts provided on the light receiving element substrate, and the light receiving element substrate may be disposed at a position at which each of the plurality of light receiving parts receives a part of light propagating in each of a plurality of rib type optical waveguides different from each other.

According to another aspect of the disclosure, the optical waveguide substrate may have a thickness of 5 µm or less.

According to another aspect of the disclosure, there is provided an optical waveguide device including any one of the optical waveguide elements, a housing configured to accommodate the optical waveguide element, an input optical fiber configured to cause light to be incident to the optical waveguide element, and an output optical fiber configured to guide output light emitted by the optical waveguide element to outside of the housing.

According to another aspect of the disclosure, a drive circuit which drives the optical waveguide element, or the drive circuit and a digital signal processor may be provided inside the housing.

According to yet another aspect of the disclosure, there is provided an optical transmission apparatus including the optical waveguide device described above in which the drive circuit is provided inside the housing, and a digital signal processor disposed outside the housing.

According to the disclosure, in an optical waveguide element using a rib type optical waveguide, it is possible to stably and accurately monitor light propagating in the rib type optical waveguide.

DESCRIPTION OF THE EMBODIMENTS

Hereinafter, embodiments of the disclosure will be described with reference to the drawings. An optical waveguide element according to the embodiment shown below is an optical modulation element configured using an LN substrate, but the optical waveguide element according to the disclosure is not limited thereto. The disclosure can be similarly applied to an optical waveguide element using a substrate other than the LN substrate and an optical waveguide element having a function other than optical modulation.

First Embodiment

Figure 1:
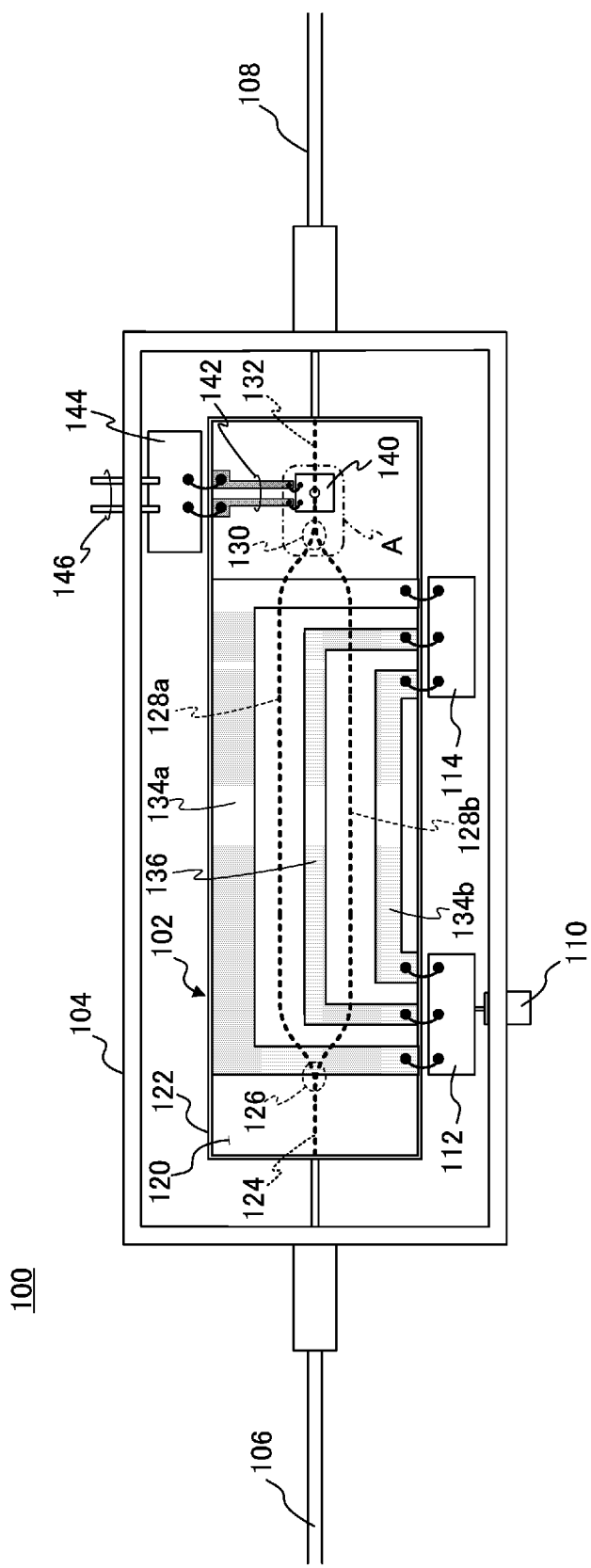
FIG. 1 is a diagram showing a configuration of an optical modulation device including an optical modulation element according to a first embodiment of the disclosure.

First, a first embodiment of the disclosure will be described. FIG. 1 is a diagram showing a configuration of an optical waveguide element and an optical waveguide device according to an embodiment of the disclosure. In this embodiment, the optical waveguide element is an optical modulation element 102 which performs optical modulation using a Mach-zehnder type optical waveguide, and the optical waveguide device is an optical modulation device 100 which uses the optical modulation element 102.

The optical modulation device 100 accommodates the optical modulation element 102 inside a housing 104. Finally, a cover (not shown) which is a plate body is fixed to an opening portion of the housing 104, and the inside thereof is hermetically sealed.

The optical modulation device 100 includes an input optical fiber 106 for inputting light into the housing 104, and an output optical fiber 108 for guiding light modulated by the optical modulation element 102 to the outside of the housing 104.

The optical modulation device 100 further includes a connector 110 which receives a high-frequency electrical signal from the outside for causing the optical modulation element 102 to perform an optical modulation operation, and a relay board 112 which relays the high-frequency electric signal received by the connector 110 to one ends of signal electrodes 134a, 134b, and 136 (which will be described later) of the optical modulation element 102. Further, the optical modulation device 100 includes a terminator 114 having a predetermined impedance connected to the other ends of the signal electrodes 134a, 134b and 136 of the optical modulation element 102. Here, the signal electrodes 134a, 134b, and 136 of the optical modulation element 102 and the relay board 112 and the terminator 114 are electrically connected by bonding to, for example, a metal wire.

The optical modulation element 102 includes, for example, an optical waveguide substrate 120 configured of LN, and a support substrate 122 which supports the optical waveguide substrate 120. The support substrate 122 is, for example, glass. The Mach-Zehnder type optical waveguide (a thick dotted line shown in the optical modulation element 102 shown in FIG. 1) is formed on the optical waveguide substrate 120. The Mach-zehnder type optical waveguide includes an input waveguide 124 which receives input light from the input optical fiber 106, a branching waveguide 126 (a waveguide portion surrounded by a dotted line circle in the drawing) which causes branching into two light waves propagating in the input waveguide 124, and two parallel waveguides 128a and 128b which respectively propagate two generated light waves after branching.

The Mach-zehnder type optical waveguide further includes a combining waveguide 130 which combines two light waves propagating through the parallel waveguides 128a and 128b, and an output waveguide 132 which guides output light, which is a combined light wave, and emits the output light toward the output optical fiber 108 from a right edge of the optical waveguide substrate 120 shown in the drawing. Hereinafter, the input waveguide 124, the branching waveguide 126, the parallel waveguides 128a and 128b, the combining wave waveguide 130, and the output waveguide 132 may also be collectively referred to as the input waveguide 124 and the like.

Here, the optical waveguide substrate 120 is processed, such that the optical waveguide substrate 120 becomes as thin as having a thickness of, for example, 1 to 2 μm or less. The optical waveguide which is the input waveguide 124 and the like is a so-called rib type optical waveguide configured of a convex portion (for example, a convex portion having a height of several μm) which is provided on the optical waveguide substrate 120, protrudes in a thickness direction of the optical waveguide substrate 120 and extends in a plane direction of the optical waveguide substrate 120. Due to the presence of the convex portion, an effective refractive index of the input waveguide 124 and the like becomes higher than that of other portions, and light is confined and guided inside the input waveguide 124 and the like.

Such a rib type optical waveguide can be formed by, for example, processing the optical waveguide substrate 120 to a desired thickness, then masking a portion of a surface of the optical waveguide substrate 120 which remains as the rib type optical waveguide with a photoresist or the like, and etching portions other than the masking portion in the thickness direction of the optical waveguide substrate 120 by dry etching or the like.

The signal electrodes 134a, 134b and 136 which control the light wave propagating through the parallel waveguides 128a and 128b by changing the refractive index of the parallel waveguides 128a and 128b are also provided on the optical waveguide substrate 120. For example, the signal electrodes 134a and 134b are ground electrodes, and the signal electrode 136 together with the signal electrodes 134a and 134b constitute a signal line which controls the light wave propagating through the parallel waveguides 128a and 128b.

According to the related art, a bias electrode which compensates for a variation in a bias point due to so-called DC drift or the like may be provided in the optical modulation element 102, but illustration thereof is not shown in FIG. 1.

In the optical modulation element 102, a light receiving element 140 is mounted on the output waveguide 132. The light receiving element 140 is coupled (evanescent coupled) with the propagating light inside the output waveguide 132 by evanescent waves leaking from the output waveguide 132, receives at least a part of the propagating light, and outputs a monitoring signal (an electric signal) corresponding to the received light. Thus, the propagating light in the output waveguide 132 can be monitored using the light receiving element 140. The monitor signal output by the light receiving element 140 is output to the outside from a pin 146 provided in the housing 104 via an electrode 142 formed on the optical waveguide substrate 120 and a relay substrate 144.

Figure 2:
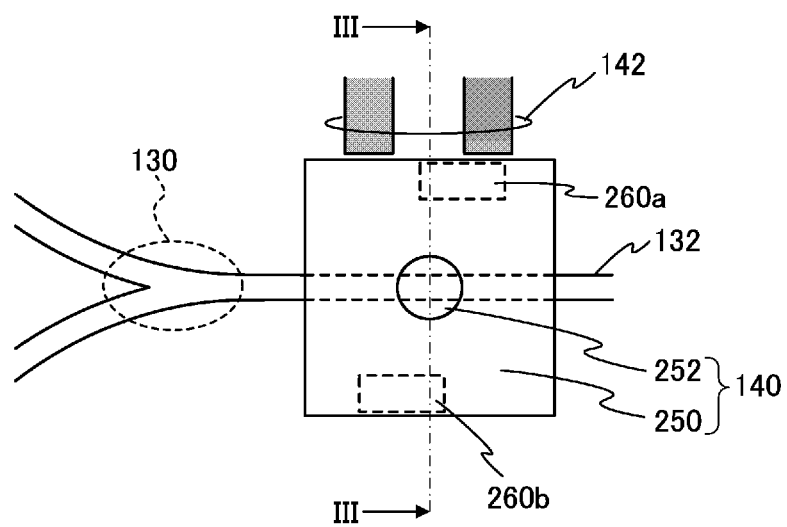
FIG. 2 is a partial detailed view of a portion A of the optical modulation element shown in FIG. 1.
Figure 3:
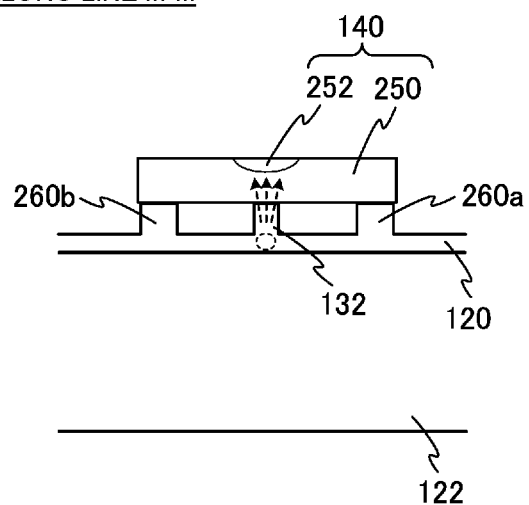
FIG. 3 is a sectional view taken along line III-III of the portion A of the optical modulation element shown in FIG. 2.

FIG. 2 is a partial detailed view of a portion A of the optical modulation element 102 shown in FIG. 1. Further, FIG. 3 is a sectional view taken along line III-III of the portion A shown in FIG. 2. In FIG. 2, a wire which connects the light receiving element 140 to the electrode 142 is not shown.

The light receiving element 140 is configured of a light receiving part 252 formed on a light receiving element substrate 250 such as silicon (Si) or a compound semiconductor. The light receiving part 252 is configured of a pn junction or a pin junction formed by doping the light receiving element substrate 250 with impurities.

In particular, in the optical modulation element 102 which is the optical waveguide element of the embodiment, the light receiving element substrate 250 of the light receiving element 140 is supported by protruding portions 260a and 260b which are first convex portions having the same height as that of the output waveguide 132 which is the rib type optical waveguide provided on the optical waveguide substrate 120. Here, the "same height" includes having a step which allows the light receiving part 252 to receive the evanescent wave from the output waveguide 132 which is the rib type optical waveguide without any problem in practical use, and includes, for example, a configuration in which a difference between the height of the output waveguide 132 which is the rib type optical waveguide and the height of the protruding portions 260a and 260b is ±0.5 μm or less. The "same height" in the following is also defined in the same way as above.

Therefore, the light receiving element 140 is supported by the protruding portions 260a and 260b in addition to the output waveguide 132, and is stably disposed on the output waveguide 132. As a result, in the optical modulation element 102, the coupling (evanescent coupling) between the output waveguide 132 and the light receiving element 140 by the evanescent wave (dotted line arrows in FIG. 3) can be stably maintained in a desired state, and the light propagating in the output waveguide 132 which is the rib type optical waveguide can be stably and accurately monitored by the light receiving element 140.

Here, the protruding portions 260a and 260b are formed by, for example, masking a portion of the surface of the optical waveguide substrate 120 on which the protruding portions 260a and 260b will be formed with a photoresist or the like, and etching portions other than the masking portion in a substrate depth direction by dry etching or the like, similarly to the rib type optical waveguide when the rib type optical waveguide such as the input waveguide 124 including the output waveguide 132 is formed at the time of manufacturing the optical modulation element 102. That is, the protruding portions 260a and 260b which are the first convex portions are, for example, parts of the optical waveguide substrate 120 and are made of the same material as that of the optical waveguide substrate 120.

In the above-described forming method, since each of an upper surface of the output waveguide 132 which is the rib type optical waveguide and upper surfaces of the protruding portions 260a and 260b is a part of the same surface of the optical waveguide substrate 120 before the dry etching or the like is performed, the protruding portions 260a and 260b can be easily formed to have the same height as that of the output waveguide 132.

In the embodiment, as shown in FIG. 2 and FIG. 3, the light receiving part 252 of the light receiving element 140 is formed in the center of the light receiving element substrate 250 having a square shape in a plan view, but the configuration of the light receiving element 140 is not limited thereto. The shape of the light receiving element substrate 250 in a plan view may be any shape other than a square shape, and the light receiving part 252 may be formed at an arbitrary position on the surface of the light receiving element substrate 250.

Further, in the embodiment, two protruding portions 260a and 260b are provided as the first convex portions, but the number of the first convex portions is not limited thereto. There may be at least one first convex portion. For example, in the light receiving element 140 shown in FIG. 2, when the light receiving part 252 is formed closer to the lower side of the light receiving element substrate 250 in the drawing, the protruding portion 260b may not be provided. In this case, the light receiving element 140 can be stably supported on the output waveguide 132 by being supported by one protruding portion 260a which is a first convex portion in addition to a contact portion between the light receiving part 252 and the output waveguide 132.

Alternatively, when a size of the light receiving element substrate 250 of the light receiving element 140 is larger and the light receiving element substrate 250 is intended to be disposed more stably on the output waveguide 132, or when a mass of the light receiving element 140 is large, for example, when it is not desired to generate excessive stress in the output waveguide 132, four or more first convex portions may be disposed on a plurality of portions including four corners of the light receiving element substrate 250 to disperse the mass of the light receiving element 140.

Hereinafter, modified examples of the optical modulation element 102 which is the waveguide type optical element according to the first embodiment of the disclosure will be described. The following modified examples of the optical modulation element 102 can be used for the optical modulation device 100 instead of the optical modulation element 102.

First Modified Example

Figure 4:
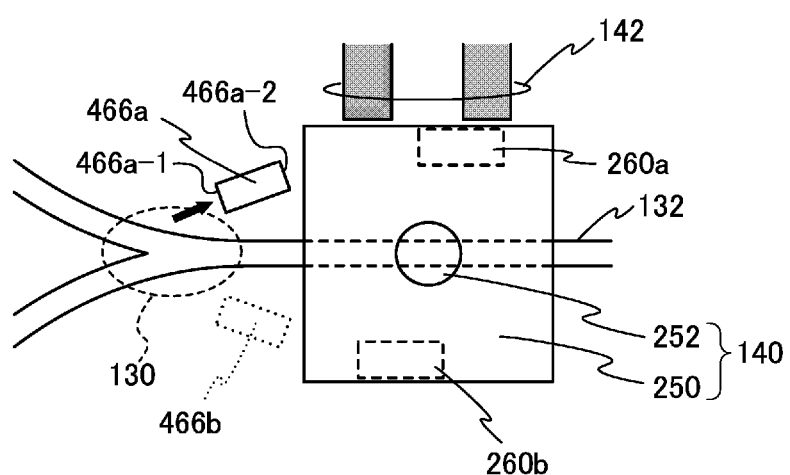
FIG. 4 is a diagram showing a first modified example of the optical modulation element which can be used in the optical modulation device shown in FIG. 1.

First, a first modified example of the optical modulation element 102 will be described. FIG. 4 is a diagram showing a configuration of an optical modulation element 102-1 according to the first modified example and is a diagram corresponding to FIG. 2 showing the configuration of the portion A of the optical modulation element 102. A portion of the optical modulation element 102-1 which is not shown in FIG. 4 is assumed to have the same configuration as that of the optical modulation element 102 shown in FIG. 1, and the above description of FIG. 1 is quoted. Further, in FIG. 4, the same reference numerals as those in FIG. 2 are used for the same components as those of the optical modulation element 102 shown in FIG. 2, and the above description of FIG. 2 is quoted.

Although the optical modulation element 102-1 shown in FIG. 4 has the same configuration as that of the optical modulation element 102 shown in FIG. 2, a protruding portion 466a which is a second convex portion is provided on the optical waveguide substrate 120 at an input waveguide side of the light receiving part 252 of the light receiving element 140 in a light propagation direction of the output waveguide 132 which is the rib type optical waveguide on which the light receiving element 140 is disposed.

Generally, in the combining waveguide 130, since a propagation mode of the light waves propagating in the two parallel waveguides 128a and 128b changes, a part of the light waves may be converted from a waveguide mode to a radiation mode and may be radiated out of the combining waveguide 130 or the output waveguide 132 as leaking light (a thick black arrow in the drawing). Then, the leaking light propagates in the optical waveguide substrate 120 and is received by the light receiving part 252, but at that time, interference or the like may occur between the light propagating in the output waveguide 132 and the leaking light, a bias point shift of a modulation curve may occur between the monitor signal and the light signal propagating in the output waveguide 132, and monitoring accuracy in the light receiving element 140 may be affected.

The optical modulation element 102-1 having the above-described configuration can reduce an amount of the leaking light reaching the light receiving part 252 by having the protruding portion 466a which is the second convex portion and disturbing a part of the leaking light generated due to the combining waveguide 130 by the protruding portion 466a. Therefore, in the optical modulation element 102-1, a decrease in the monitoring accuracy in the light receiving element 140 due to the leaking light can prevented, and a more stable and accurate monitor operation can be achieved.

Here, the second convex portion shown by the protruding portion 466a as an example may have an arbitrary shape in a plan view and may be disposed in an arbitrary direction. However, in the sense that the above-described effects are effectively realized, preferably, the second convex portion extends in the plane direction of the optical waveguide substrate 120, for example, like the protruding portion 466a, and also a distance between one end portion of the second convex portion facing the input waveguide side of the output waveguide 132 and the output waveguide 132 is formed to be smaller than a distance between the other end portion of the second convex portion and the output waveguide 132. Thus, the leaking light generated in the combining waveguide 130 can be guided in a direction other than the light receiving part 252.

Further, for example, in the sense that the leaking light is effectively trapped in a portion of the second convex portion, a height of the second convex portion which is the protruding portion 466a is preferably the same as that of the input waveguide 124 and the like which is the rib type optical waveguide so that the leaking light can be guided.

In FIG. 4, although one protruding portion 466a which is the second convex portion is provided, the number of the second convex portions is not limited thereto. The second convex portion may be an arbitrary number (that is, at least one) within a range necessary for preventing deterioration of the monitoring accuracy due to the leaking light. Further, a position at which the second convex portion is disposed may be an arbitrary position at an input waveguide side of the light receiving part 252 in the propagation direction of the propagating light of the output waveguide 132 to be monitored. For example, in FIG. 4, when it is considered that non-negligible leaking light is also generated on the lower side of the combining waveguide 130 in the drawing, the second protruding portion 466b which is the second convex portion may be provided at a position indicated by a dotted line in FIG. 4.

Second Modified Example

Figure 5:
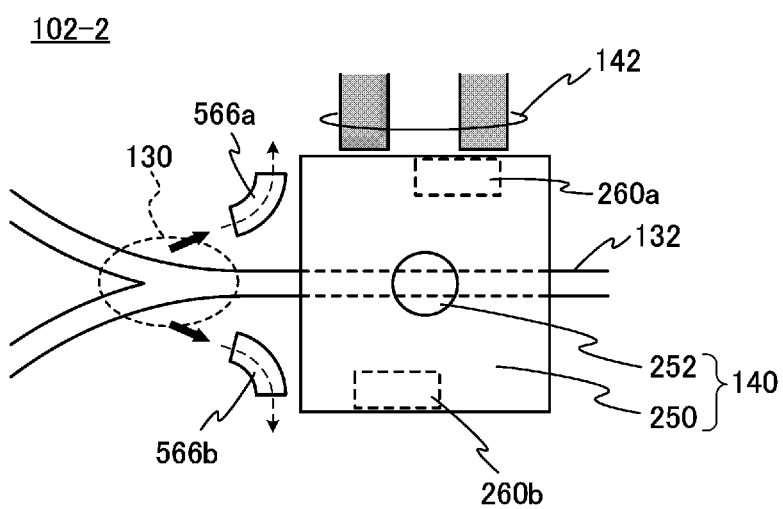
FIG. 5 is a diagram showing a second modified example of the optical modulation element which can be used in the optical modulation device shown in FIG. 1.

Next, a second modified example of the optical modulation element 102 will be described. FIG. 5 is a diagram showing a configuration of an optical modulation element 102-2 according to the second modified example, and is a diagram corresponding to FIG. 2 showing the configuration of the portion A of the optical modulation element 102. A portion of the optical modulation element 102-2 which is not shown in FIG. 5 is assumed to have the same configuration as that of the optical modulation element 102 shown in FIG. 1, and the above description of FIG. 1 is quoted. Further, in FIG. 5, the same reference numerals as those in FIG. 2 are used for the same components as those of the optical modulation element 102 shown in FIG. 2, and the above description of FIG. 2 is quoted.

The optical modulation element 102-2 shown in FIG. 5 corresponds to that, in the optical modulation element 102-1 shown in FIG. 4, a protruding portion 566a having a different shape from that of the protruding portion 466a in a plan view is disposed as the second convex portion, instead of the protruding portion 466a. Here, the protruding portion 566a is formed to have a curved quadrilateral shape having two opposite sides configured of a curved line, unlike the protruding portion 466a having a rectangular shape in a plan view.

Further, in the optical modulation element 102-2, a protruding portion 566b having the same shape in a plan view as that of the protruding portion 566a is also disposed as the second convex portion at a position opposite to the protruding portion 566a with the output waveguide 132 interposed therebetween.

Additionally, each of the protruding portions 566a and 566b extends in the plane direction of the optical waveguide substrate 120, and also both end portions thereof in the extending direction are configured of one end portion which faces the input waveguide side of the output waveguide 132 to be monitored and the other end portion which faces in a direction away from the light receiving part 252.

In the optical modulation element 102-2, since the protruding portions 566a and 566b which are the second convex portions are configured so that the shapes thereof in a plan view are curved, the propagation direction of the leaking light which is incident on the protruding portions 566a and 566b can be changed along the shapes of the protruding portions 566a and 566b, as shown by dotted arrows in FIG. 5. Therefore, in the optical modulation element 102-2, the amount of leaking light propagating to the light receiving part 252 can be further reduced, and a more accurate monitor operation can be achieved as compared with the optical modulation element 102-1.

In order to more effectively propagate the leaking light in the protruding portions 566a and 566b and to change the direction thereof, preferably, a height of each of the protruding portions 566a and 566b is the same as the height of the input waveguide 124 and the like which is the rib type optical waveguide.

Third Modified Example

Figure 6:
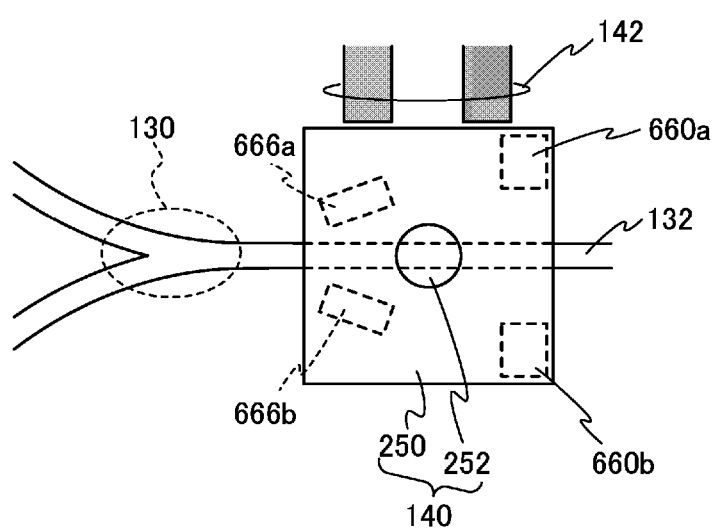
FIG. 6 is a diagram showing a third modified example of the optical modulation element which can be used in the optical modulation device shown in FIG. 1.

Next, a third modified example of the optical modulation element 102 will be described. FIG. 6 is a diagram showing a configuration of an optical modulation element 102-3 according to the third modified example, and is a diagram corresponding to FIG. 2 showing the configuration of the portion A of the optical modulation element 102. A portion of the optical modulation element 102-3 which is not shown in FIG. 6 is assumed to have the same configuration as that of the optical modulation element 102 shown in FIG. 1, and the above description of FIG. 1 is quoted. Further, in FIG. 6, the same reference numerals as those in FIG. 2 are used for the same components as those of the optical modulation element 102 shown in FIG. 2, and the above description of FIG. 2 is quoted.

In the optical modulation element 102-3 shown in FIG. 6, protruding portions 660a and 660b are formed at positions of two corner portions on the right side of the light receiving element substrate 250 constituting the light receiving element 140 in the drawing on the surface of the optical waveguide substrate 120. These protruding portions 660a and 660b are first convex portions which are formed at the same height as that of the output waveguide 132 which is the rib type optical waveguide, and support the light receiving element substrate 250.

Further, in the optical modulation element 102-3, the protruding portions 666a and 666b having the same shape as that of the protruding portions 466a and 466b which are the second convex portions shown in FIG. 4 are disposed at an input waveguide side of the light receiving part 252 along the output waveguide 132 as the second protruding portions. However, unlike the protruding portions 466a and 466b shown in FIG. 4, the protruding portions 666a and 666b are located below the light receiving element substrate 250 of the light receiving element 140, are formed at the same height as the output waveguide 132, and also serve as the first convex portions which support the light receiving element substrate 250 of the light receiving element 140.

In the optical modulation element 102-3 configured as described above, since the protruding portions 666a and 666b which are the second convex portions for preventing the leaking light from the combining waveguide 130 from propagating to the light receiving part 252 also serve as the first convex portions for supporting the light receiving element 140, the monitoring accuracy in the light receiving element 140 can be maintained high and stable without complicating the configuration of the optical modulation element 102-3.

Fourth Modified Example

Figure 7:
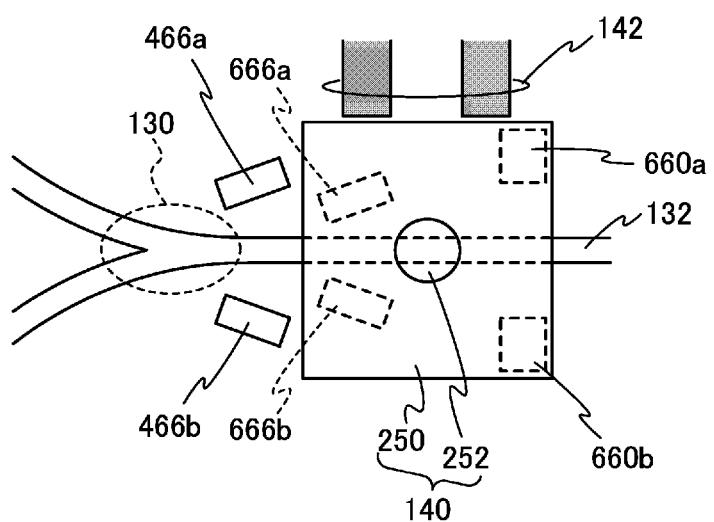
FIG. 7 is a diagram showing a fourth modified example of the optical modulation element which can be used in the optical modulation device shown in FIG. 1.

Next, a fourth modified example of the optical modulation element 102 will be described. FIG. 7 is a diagram showing a configuration of an optical modulation element 102-4 according to the fourth modified example, and is a diagram corresponding to FIG. 2 showing the configuration of the portion A of the optical modulation element 102. A portion of the optical modulation element 102-4 which is not shown in FIG. 7 is assumed to have the same configuration as that of the optical modulation element 102 shown in FIG. 1, and the above description of FIG. 1 is quoted. Further, in FIG. 7, the same reference numerals as those in FIG. 2, FIG. 4, and FIG. 6 are used for the same components as those of each of the optical modulation elements 102, 102-1, and 102-3 shown in FIG. 2, FIG. 4, and FIG. 6, and the above description of FIG. 2, FIG. 4 and FIG. 6 is quoted.

The optical modulation element 102-4 shown in FIG. 7 has the same configuration as that of the optical modulation element 102-3 shown in FIG. 6, and further includes the protruding portions 466a and 466b that the optical modulation element 102-1 shown in FIG. 4 has or may have.

The optical modulation element 102-4 having the above-described configuration has protruding portions 466a, 466b, 666a, and 666b which are second convex portions on the input waveguide side of the light receiving part 252 of the light receiving element 140 along the output waveguide 132 to be monitored, and the protruding portions 666a and 666b are also the first convex portions which support the light receiving element 140. Therefore, in the optical modulation element 102-4, the monitoring accuracy in the light receiving element 140 which is higher and more stable than the light modulation elements 102, 102-1 and 102-3 can be achieved without significantly increasing the number of the first convex portions and/or the second convex portions.

Fifth Modified Example

Figure 8:
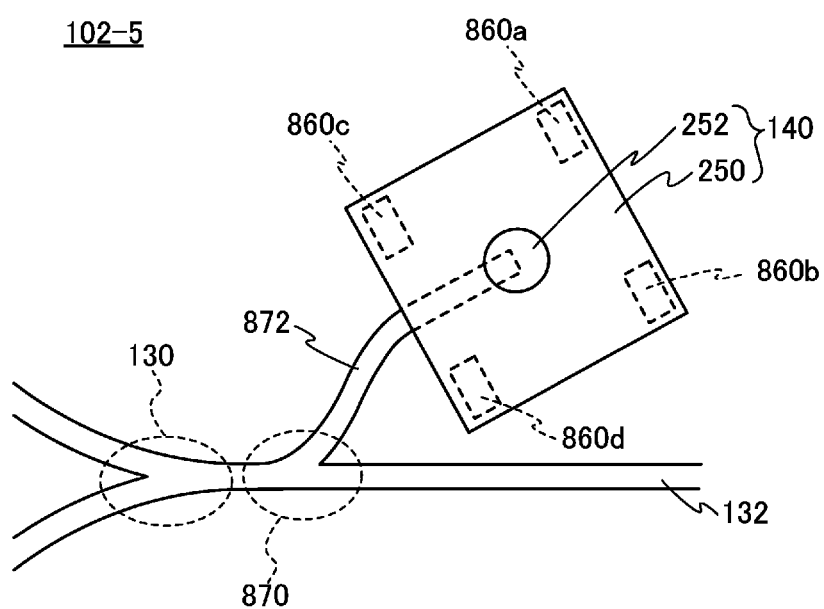
FIG. 8 is a diagram showing a fifth modified example of the optical modulation element which can be used in the optical modulation device shown in FIG. 1.

Next, a fifth modified example of the optical modulation element 102 will be described. FIG. 8 is a diagram showing a configuration of an optical modulation element 102-5 according to the fifth modified example, and is a diagram corresponding to FIG. 2 showing the configuration of the portion A of the optical modulation element 102. In FIG. 8, the electrode 142 is not shown (the same applies to FIG. 9 and FIG. 10 which will be described later). Further, a portion of the optical modulation element 102-5 which is not shown in FIG. 8 is assumed to have the same configuration as that of the optical modulation element 102 shown in FIG. 1, and the above description of FIG. 1 is quoted. Further, in FIG. 8, the same reference numerals as those in FIG. 2 are used for the same components as those of the optical modulation element 102 shown in FIG. 2, and the above description of FIG. 2 is quoted.

The optical modulation element 102-5 shown in FIG. 8 has the same configuration as that of the optical modulation element 102 shown in FIG. 2, and further includes an additional branching waveguide 870 on the output waveguide side of the combining waveguide 130 in the propagation direction of the light wave in the output waveguide 132. Further, the optical modulation element 102-5 is different from the optical modulation element 102 in that the light receiving part 252 of the light receiving element 140 is disposed above an end portion of a monitor waveguide 872 which branches from the output waveguide 132 by the branching waveguide 870. That is, in the optical modulation element 102-5, the monitor waveguide 872 which is the rib type optical waveguide is terminated below a light receiving range of the light receiving part 252 of the light receiving element 140 (for example, a range of a solid circle showing the light receiving part 252 in FIG. 8).

Here, the output waveguide 132 is a main path which guides the output light, which is modulated light modulated by the signal electrodes 134a, 134b, and 136 (refer to FIG. 1), to an end portion of the optical waveguide substrate 120, and the monitor waveguide 872 is a branching path provided by branching from the output waveguide 132 which is the main path. Further, similar to the input waveguide 124 and the like, the branching waveguide 870 and the monitor waveguide 872 are formed, for example, as the rib type optical waveguide configured of convex portions which extend to the optical waveguide substrate 120 at the same height as that of the output waveguide 132. That is, in the optical modulation element 102-5, the light receiving part 252 of the light receiving element 140 is disposed on the branching path of the rib type optical waveguide formed on the optical waveguide substrate 120 which is provided by branching from the main path which emits output light to the end portion of the optical waveguide substrate 120.

In optical modulation element 102-5, for example, the light receiving element substrate 250 of the light receiving element 140 having a rectangular shape is supported by protruding portions 860a, 860b, 860c, and 860d which are the first convex portions disposed at the four corners of the light receiving element substrate 250 on the surface of the optical waveguide substrate 120. Here, the protruding portions 860a, 860b, 860c, and 860d are formed as convex portions having the same height as that of the monitor waveguide 872 which is the rib type optical waveguide.

In the optical modulation element 102-5 having the above configuration, in particular, since the light receiving element 140 is provided on the monitor waveguide 872 which is the branching path provided by branching from the output waveguide 132 which is the main path, unlike the optical modulation element 102 in which the light receiving element 140 is disposed on the output waveguide 132, it is possible to prevent an intensity of the output light emitted from the optical waveguide substrate 120 from fluctuating for each individual due to a manufacturing variation in a contact state between the light receiving element 140 and the output waveguide 132.

Further, since the monitor waveguide 872 only needs to propagate the light wave to the light receiving element 140, in the optical modulation element 102-5, the light receiving part 252 of the light receiving element 140 can be disposed at an end portion of the monitor waveguide 872, as described above. Therefore, the light receiving element 140 can receive light radiated and scattered from the end portion of the monitor waveguide 872 in addition to the light received by the evanescent coupling with the monitor waveguide 872. As a result, in the optical modulation element 102-5, an amount of light of the light wave which is incident on the light receiving element 140 can be increased so that the light receiving element 140 receives some or whole (that is, at least some) of the light propagating in the monitor waveguide 872 which is the rib type optical waveguide. Therefore, the monitoring accuracy of the light receiving element 140 can be improved.

Sixth Modified Example

Figure 9:
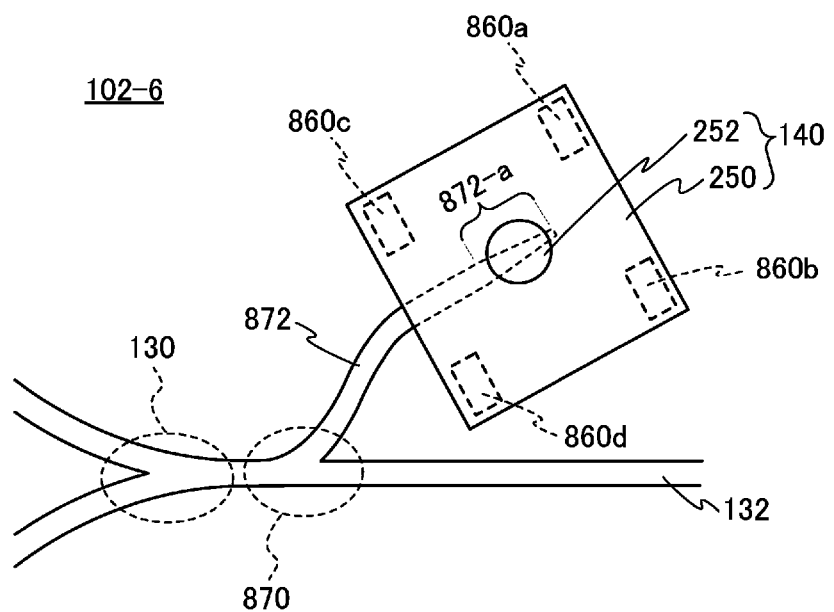
FIG. 9 is a diagram showing a sixth modified example of the optical modulation element which can be used in the optical modulation device shown in FIG. 1.

Next, a sixth modified example of the optical modulation element 102 will be described. FIG. 9 is a diagram showing a configuration of an optical modulation element 102-6 according to the sixth modified example, and is a diagram corresponding to FIG. 2 showing the configuration of the portion A of the optical modulation element 102. A portion of the optical modulation elements 102-6 which is not shown in FIG. 9 is assumed to have the same configuration as that of the optical modulation element 102 shown in FIG. 1, and the above description of FIG. 1 is quoted. Further, in FIG. 9, the same reference numerals as those in FIG. 2 and FIG. 8 are used for the same components as those of each of the optical modulation elements 102 and 102-5 shown in FIG. 2 and FIG. 8, and the above description of FIG. 2 and FIG. 8 is quoted.

Although the optical modulation element 102-6 shown in FIG. 9 has the same configuration as that of the optical modulation element 102-5 shown in FIG. 8, the monitor waveguide 872 has a width changing portion 872-a of which a waveguide width decreases toward the end portion of the monitor waveguide 872, and the light receiving part 252 of the light receiving element 140 is disposed on the width changing portion 872-a.

Thus, in the optical modulation element 102-6, similarly to the optical modulation element 102-5 shown in FIG. 8, the light receiving element 140 can receive light emitted and scattered from the width changing portion 872-a in addition to the light received by the evanescent coupling with the monitor waveguide 872. As a result, in the optical modulation element 102-6, an amount of light of the light wave which is incident on the light receiving element 140 can be increased, and the monitoring accuracy in the light receiving element 140 can be improved.

In the configuration shown in FIG. 9, an end portion of the width changing portion 872-a (hence, an end portion of the monitor waveguide 872) is not present below the light receiving part 252, but the disclosure is limited thereto. The light receiving part 252 of the light receiving element 140 may be disposed on the end portion of the width changing portion 872-a. Thus, the amount of light of the light wave which is incident on the light receiving part 252 can be further increased.

Further, in the configuration shown in FIG. 9, the width changing portion 872-a is configured so that the waveguide width decreases monotonically toward the end portion thereof, but a shape of the width changing portion 872-a is not limited thereto. The waveguide width of the width changing portion 872-a may be changed in an arbitrary pattern as long as the light wave of the monitor waveguide 872 can be radiated and scattered. For example, the width changing portion 872-a may be formed so that the waveguide width changes regularly or irregularly.

Seventh Modified Example

Figure 10:
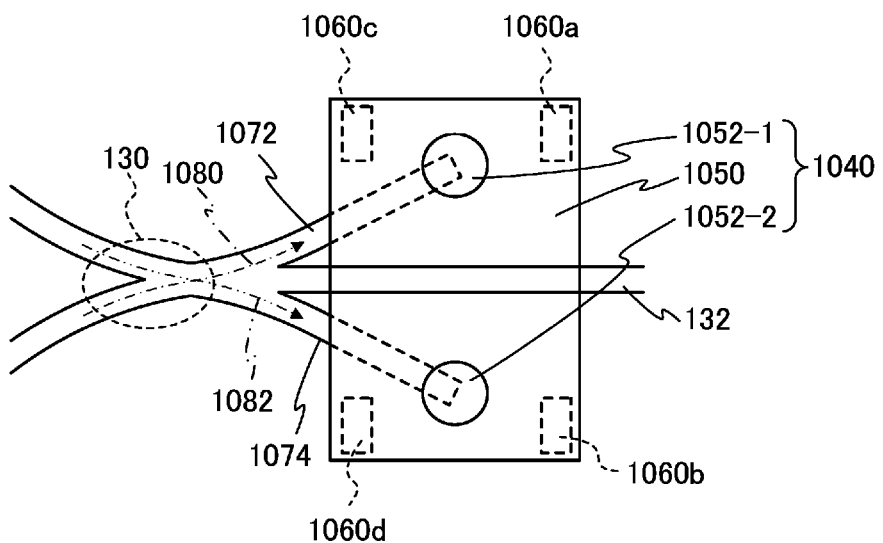
FIG. 10 is a diagram showing a seventh modified example of the optical modulation element which can be used in the optical modulation device shown in FIG. 1.

Next, a seventh modified example of the optical modulation element 102 will be described. FIG. 10 is a diagram showing a configuration of an optical modulation element 102-7 according to the seventh modified example, and is a diagram corresponding to FIG. 2 showing the configuration of the portion A of the optical modulation element 102. A portion of the optical modulation elements 102-7 which is not shown in FIG. 10 is assumed to have the same configuration as that of the optical modulation element 102 shown in FIG. 1, and the above description of FIG. 1 is quoted. Further, in FIG. 10, the same reference numerals as those in FIG. 2 are used for the same components as those of the optical modulation element 102 shown in FIG. 2, and the above description of FIG. 2 is quoted.

Although the optical modulation element 102-7 shown in FIG. 10 has the same configuration as the optical modulation element 102 shown in FIG. 2, branching waveguides 1072 and 1074 which branch from the output waveguide 132 and are disposed to guide so-called off-lights 1080 and 1082 that do not contribute to the output light in a Y-shaped combining waveguide 130 are provided therein.

Further, the optical modulation element 102-7 is different from the optical modulation element 102 of FIG. 2 in that a light receiving element 1040 having two light receiving parts 1052-1 and 1052-2 formed on the light receiving element substrate 1050 is provided instead of the light receiving element 140. As in the light receiving element 140, a light receiving element substrate 1050 constituting the light receiving element 1040 can be a light receiving element substrate made of, for example, Si, and the light receiving parts 1052-1 and 1052-2 are configured of a pn junction or a pin junction formed by doping the light receiving element substrate which is the light receiving element substrate 1050 with impurities.

In the light receiving element 1040, four corners of the light receiving element substrate 1050 having a substantially rectangular shape are supported by protruding portions 1060a, 1060b, 1060c, and 1060d which are the first convex portions provided on the optical waveguide substrate 120 so that the light receiving parts 1052-1 and 1052-2 are disposed on the end portions of the branching waveguides 1072 and 1074.

In the optical modulation element 102-7 having the above-described configuration, since the branching waveguides 1072 and 1074 are continuously configured in the combining waveguide 130, the light waves which do not contribute to the output light in the combining waveguide 130 do not become leaking light (for example, the thick black arrow in FIG. 4) but propagate through the branching waveguides 1072 and 1074. Additionally, in the optical modulation element 102-7, the light waves propagating through the branching waveguides 1072 and 1074 are received by the two light receiving parts 1052-1 and 1052-2 constituting one light receiving element 1040.

Since the light waves propagating in the branching waveguides 1072 and 1074 have opposite phase shift directions of the modulated waveforms, the output signals of the light receiving parts 1052-1 and 1052-2 are, for example, added and extracted as an accurate monitor signal. Further, in this configuration, most of the off-lights 1080 and 1082 which do not contribute to the output light in the combining waveguide 130 are guided by the branching waveguides 1072 and 1074, but a part of them propagate as leaking light in the optical waveguide substrate 120. In addition, stray light generated from another optical waveguide portion (for example, a curved waveguide portion, a branching waveguide 126, or the like) may propagate inside the optical waveguide substrate 120. Since the protruding portions 1060c and 1060d also serve as the second convex portions with respect to the stray light, generation of noise caused by the stray light is curbed in the light receiving parts 1052-1 and 1052-2.

Accordingly, in the optical modulation element 102-7, due to the simple configuration without increasing the number of light receiving elements, it is possible to improve the monitoring accuracy of the light wave propagating in the output waveguide 132 while the generation of the leaking light in the combining waveguide 130 is curbed.

Second Embodiment

Figure 11:
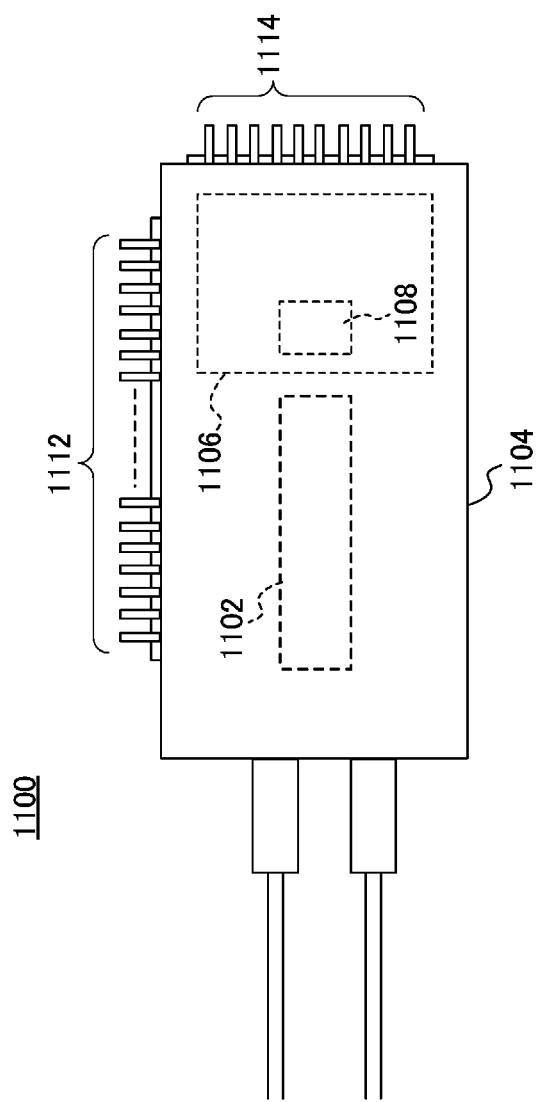
FIG. 11 is a diagram showing a configuration of an optical waveguide device according to a second embodiment of the disclosure.

Next, a second embodiment of the disclosure will be described. FIG. 11 is a diagram showing a configuration of an optical waveguide device according to the second embodiment of the disclosure. The optical waveguide device 1100 includes a housing 1104, and an optical waveguide element 1102 and a circuit board 1106 which are accommodated in the housing 1104.

The optical waveguide element 1102 may be, for example, the optical modulation element 102 shown in FIG. 1 or any one of the modified examples thereof. Alternatively, the optical waveguide element 1102 may be an optical waveguide element having an arbitrary optical waveguide pattern which has the same support structure of the light receiving element as the support structure of each of the light receiving elements 140 and 1040 included in the optical modulation element 102 or any one of the modified examples thereof. Such an optical waveguide element may be a DP-QPSK optical modulation element configured of a so-called nested Mach-zehnder type optical waveguide as described in Japanese Patent Laid-Open No. 2019-159189.

The circuit board 1106 is configured of a drive part 1108 for driving an optical waveguide element and a wiring thereof (not shown). The drive part 1108 is configured of a drive circuit (a driver: not shown), or a drive circuit (a driver: not shown) and a digital signal processor (DSP: not shown). The DSP processes, for example, transmission data supplied from the outside via pins 1114 provided in the housing 1104, generates a modulated signal for transmitting the transmitted data as an optical signal (for example, a modulated signal in which error correction data is added to the transmission data, or a modulated signal which is converted according to various transmission formats or which is compensated for optimizing the optical signal), and inputs the generated modulated signal to the optical waveguide element 1102 via a drive circuit.

Pins 1112 for inputting an output signal of the light receiving element supported by the support structure in the optical waveguide element 1102 or an input signal for a bias electrode that the optical waveguide element 1102 may have are provided in the housing 1104.

The circuit board 1106 configured of the drive circuit and the DSP is an example, and the configuration of the circuit board 1106 is not limited thereto. It is also possible that the circuit board 1106 does not have the DSP mounted thereon. In this case, the DSP may be disposed outside the housing 1104 of the optical waveguide device 1100 in a device configured of the optical waveguide device 1100.

Third Embodiment

Figure 12:
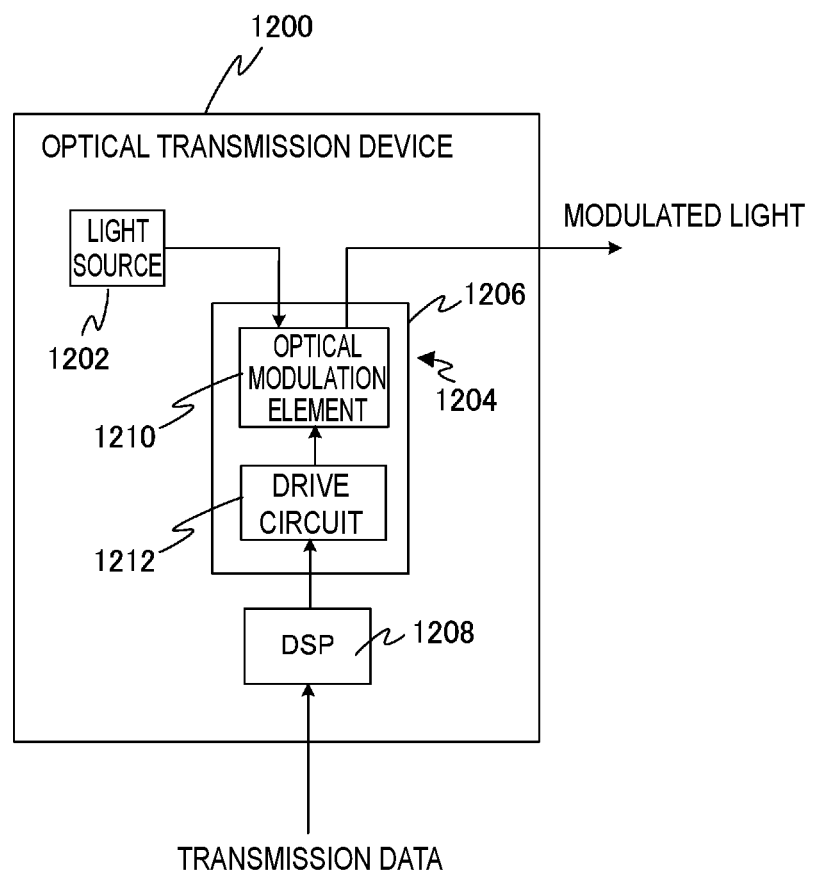
FIG. 12 is a diagram showing a configuration of an optical transmission apparatus according to a third embodiment of the disclosure.
Figure 13:
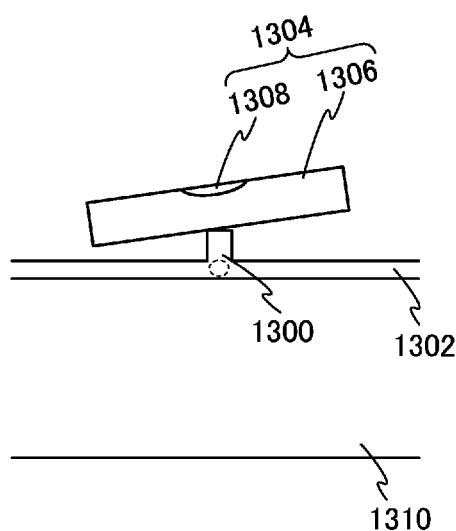
FIG. 13 is a diagram showing a configuration of a conventional optical waveguide element in which a light receiving element is disposed on a rib type optical waveguide.

Next, a third embodiment of the disclosure will be described. FIG. 12 is a diagram showing a configuration of an optical transmission apparatus 1200 according to the third embodiment of the disclosure. The optical transmission apparatus 1200 includes a light source 1202, an optical waveguide device 1204, and a DSP 1208 disposed outside a housing 1206 of the optical waveguide device 1204. The light source 1202 is, for example, a semiconductor laser. The DSP 1208 processes, for example, transmission data input to the optical transmission apparatus 1200 and generates modulation data for transmitting the transmission data as an optical signal.

The optical waveguide device 1204 includes an optical waveguide element 1210 which is an optical waveguide element, and a drive part 1212 which drives the optical modulation element 1210 inside the housing 1206. The optical waveguide device 1204 is, for example, the optical waveguide device 1100 shown in FIG. 11, and the drive part may be an optical waveguide device which is configured of a drive circuit (a driver: not shown) and does not include the DSP.

The optical modulation element 1210 of the optical waveguide device 1204 may be, for example, the optical modulation element 102 shown in FIG. 1 or any one of the modified examples thereof. Alternatively, the optical modulation element 1210 may be an optical modulation element having an arbitrary optical waveguide pattern which has the same support structure of the light receiving element as the support structure of each of the light receiving elements 140 and 1040 included in the optical modulation element 102 or any one of the modified examples thereof.

The disclosure is not limited to the configuration of the above-described embodiments and the modified examples thereof, and can be implemented in various embodiments without departing from the gist thereof.

For example, in the embodiment according to the fifth modified example shown in FIG. 8, the light receiving part 252 of the light receiving element 140 is disposed at an upper portion of the end portion of the monitor waveguide 872, but the arrangement of the light receiving part 252 is not limited thereto. The light receiving part 252 is not limited to the upper portion of the end portion but may be disposed at an arbitrary position on the monitor waveguide 872 which is a branching path provided by branching from the output waveguide 132 which is the main path.

Further, in the above-described optical modulation element 102 and the optical modulation elements 102-1 to 102-7 (hereinafter, also referred to as the optical modulation element 102 and the like) which are the modified examples thereof, the branching waveguides 126 and 870 are configured of Y-shaped waveguides as shown in FIG. 1 to FIG. 10, but the configuration of the branching waveguides is not limited thereto, and may be branching waveguides based on an arbitrary shape or principle. For example, the combining waveguide 130 and the branching waveguide 870 included in the optical modulation elements 102-5 and 102-6 shown in FIG. 8 and FIG. 9 may be configured of one multi-mode interference (MMI) waveguide or directional coupler. When the combining waveguide 130 and the branching waveguide 870 are configured of the multimode interference waveguide, the monitor waveguide 872 which is the branching path extends from the multimode interference waveguide. Then, off-light which does not contribute to the output light generated by interference of a combining part propagates through the monitor waveguide, and is taken out and used as monitor light.

Further, although the optical modulation element 102-7 shown in FIG. 10 includes a light receiving element 1040 having two light receiving parts 1052-1 and 1052-2 formed on one light receiving element substrate 1050, and in the light receiving element 1040, the light receiving parts 1052-1 and 1052-2 are disposed on the branching waveguides 1072 and 1074 branching from the output waveguide 132, the configuration of the light receiving element and the arrangement thereof are not limited thereto. In the optical waveguide element according to the disclosure in which the optical modulation element 102 and the like is shown as an example, the light receiving element may include a plurality of light receiving parts provided on the light receiving element substrate, and the light receiving element substrate may be disposed at a position at which each of the plurality of light receiving parts can receive some or whole of the light propagating in each of the rib type optical waveguides on the upper portion of the plurality of rib type optical waveguides different from each other.

Also, as will be apparent to those skilled in the art, the characteristic configurations of the optical modulation elements 102 shown in FIG. 1 to FIG. 10 and the optical modulation elements 102-1 to 102-7 which are the modified examples thereof can be used in an overlapping manner in each of these optical modulation elements. For example, the optical modulation elements 102-5 to 102-7 shown in FIG. 8 to FIG. 10 do not have the second convex portion, but may include the protruding portion 466a or the like which is the second convex portion included in each of the optical modulation elements 102-1 to 102-4 shown in FIG. 4 to FIG. 7. Further, for example, in the optical modulation element 102-7 shown in FIG. 10, each of the branching waveguides 1072 and 1074 may have the same width changing portion as that of the monitor waveguide 872 of the optical modulation element 102-6 shown in FIG. 9, and each of the light receiving parts 1052-1 and 1052-2 may be disposed on such a width changing portion.

Further, in the above-described first embodiment and modified examples thereof, the optical waveguide substrate 120 is processed such that it becomes as thin as having a thickness of, for example, 1 to 2 μm or less, but the thickness of the optical waveguide substrate 120 is not limited thereto. In the configuration of the disclosure, for example, in a configuration using the optical waveguide substrate 120 having a thickness of 5 μm or less, the light receiving element can be stably supported on the rib type optical waveguide, the light propagating in the rib type optical waveguide can be stably and accurately monitored, and occurrence of mechanical damage such as a crack in the optical waveguide substrate 120 caused by the generation of stress due to the tilting of the light receiving element can be effectively prevented.

Further, in the above-described embodiment and modified examples thereof, although the optical waveguide substrate 120 is configured of LN, the material of the optical waveguide substrate 120 is not limited thereto. For example, the optical waveguide substrate 120 may be made of any dielectric or semiconductor material other than LN.

As described above, the optical modulation element 102 which is the optical waveguide element shown in the embodiment includes the output waveguide 132 which is the rib type optical waveguide provided on the optical waveguide substrate 120 and is configured of a convex portion protruding in the thickness direction of the optical waveguide substrate 120 and extending in the plane direction of the optical waveguide substrate 120, and the light receiving element 140. Here, the light receiving element 140 includes the light receiving part 252 formed on the light receiving element substrate 250 disposed on the output waveguide 132 which is the rib type optical waveguide, and receives at least a part of the light propagating in the output waveguide 132 by the light receiving part 252. Additionally, the light receiving element substrate 250 constituting the light receiving element 140 is supported by at least one of the protruding portions 260a and 260b which are the first convex portions having the same height as that of the rib type optical waveguide provided on the optical waveguide substrate 120.

According to this configuration, in an optical waveguide element using the rib type optical waveguide, like the optical modulation element 102, the light propagating in the rib type optical waveguide can be monitored stably and accurately.

Further, in the optical modulation element 102-1 according to the first modified example, at least one protruding portion 466a which is the second convex portion is provided on the optical waveguide substrate 120 at an input waveguide side of the light receiving part 252 in the light propagation direction of the output waveguide 132 which is the rib type optical waveguide. According to this configuration, the leaking light coming from the input waveguide side is disturbed by the second convex portion, the deterioration of the monitoring accuracy in the light receiving element 140 due to the leaking light can be prevented, and a more stable and accurate monitor operation can be achieved.

Further, for example, in the optical modulation element 102-1 according to the first modified example, the protruding portion 466a which is the second convex portion extends in the plane direction of the optical waveguide substrate 120, and also, at of both end portions thereof in the extending direction, a distance between one end portion facing the input waveguide side of the output waveguide 132 which is the rib type optical waveguide and the output waveguide 132 is configured to be smaller than a distance between the other end portion opposite to the one end portion and the output waveguide 132. According to this configuration, the leaking light generated in the input waveguide side can be guided in a direction other than the light receiving part 252, and a more stable and accurate monitor operation can be achieved.

Further, for example, in the optical modulation element 102-1 according to the first modified example, the protruding portion 466a which is the second convex portion has the same height as that of the input waveguide 124 which is the rib type optical waveguide. According to this configuration, the leaking light from the input waveguide side can be guided by the second convex portion in the direction other than the light receiving part 252, and a more stable and accurate monitor operation can be achieved.

Further, for example, in the optical modulation element 102-4 according to the fourth modified example, at least one of the second convex portions, for example, the protruding portions 666a and 666b, is the first convex portion which supports the light receiving element substrate 250 of the light receiving element 140. According to this configuration, higher and more stable monitoring accuracy can be achieved without significantly increasing the number of protruding portions.

Further, for example, in the optical modulation element 102-5 according to the fifth modified example, the monitor waveguide 872 which is the rib type optical waveguide is terminated at a lower portion of a light receiving range of the light receiving part 252 of the light receiving element 140. According to this configuration, an amount of light of the light wave which is incident on the light receiving part 252 of the light receiving element 140 can be increased, and the monitoring accuracy by the light receiving element 140 can be improved.

Further, for example, in the optical modulation element 102-5 according to the fifth modified example, the light receiving part 252 of the light receiving element 140 is disposed on the monitor waveguide 872 which is the branching path provided by branching from the output waveguide 132 which is the main path for guiding the output light to the end portion of the optical waveguide substrate 120. According to this configuration, since the light receiving element 140 is not disposed on the output waveguide 132, it is possible to prevent the intensity of the output light emitted from the optical waveguide substrate 120 from being dispersed for each individual due to a manufacturing variation in a contact state between the light receiving element 140 and the output waveguide 132.

Further, for example, in the optical modulation element 102-5 according to the fifth modified example, a portion configured of the combining waveguide 130 and the branching waveguide 870 can be configured by the multi-mode interference waveguide so that the monitor waveguide 872 which is the branching path extends from the multi-mode interference waveguide. According to this configuration, it is possible to improve the monitoring accuracy by the light receiving element 140 while the optical path is simplified.

Further, the light receiving element may include a plurality of light receiving parts provided on the light receiving element substrate, and the light receiving element substrate may be disposed at a position at which each of the plurality of light receiving parts receives a part of the light propagating through each of the plurality of different rib type optical waveguides. For example, in the optical modulation element 102-7 according to the seventh modified example, the plurality of rib type optical waveguides different from each other are branching waveguides 1072 and 1074 which are two branching paths for branching a part of the propagating light of the output waveguide 132, which is the main path for guiding the output light to the end portion of the optical waveguide substrate 120, in directions opposite to each other with the output waveguide 132 interposed therebetween. According to this configuration, it is possible to improve the monitoring accuracy of the light wave propagating in the output waveguide 132 while the generation of leaking light in the combining waveguide 130 is curbed by a simple configuration without increasing the number of light receiving elements.

Further, in the optical modulation element 102, the optical waveguide substrate 120 has a thickness of 5 μm or less.

According to this configuration, on the optical waveguide substrate 120 which is formed such that it becomes thinner and is easily damaged by stress, the light receiving element 140 configured of the light receiving element substrate 250 can be stably held on the rib type optical waveguide.

Further, in the optical modulation element 102 and the like, the protruding portion 260a and the like which are the first convex portions are a part of the optical waveguide substrate 120 and are made of the same material as that of the optical waveguide substrate 120. According to this configuration, the first convex portion having the same height as that of the rib type optical waveguide can be easily formed by selectively cutting the surface of the optical waveguide substrate 120 processed to a predetermined thickness by, for example, dry etching.

Further, the optical modulation device 100 which is the optical waveguide device includes any one optical waveguide element such as the optical modulation element 102 shown in FIG. 1 to FIG. 10, the housing 104 which accommodates the optical waveguide element, the input optical fiber 106 which causes light to be incident to the optical waveguide element, and the output optical fiber 108 which guides the output light emitted by the optical waveguide element to the outside of the housing 104. According to this configuration, it is possible to realize an optical waveguide device which can realize high and stable monitoring accuracy.

Further, the optical waveguide device 1100 according to the above-described second embodiment includes the drive part 1108 for driving the optical waveguide element 1102 inside the housing 1104, and the drive part includes a drive circuit or a drive circuit and a DSP.

Further, the optical transmission apparatus 1200 according to the third embodiment described above includes the optical waveguide device 1204 having the drive part 1212 inside the housing 1206, and the DSP 1208 disposed outside the housing 1206.

What is claimed is:
1. An optical waveguide element, comprising:
an optical waveguide substrate;
a rib type optical waveguide, provided on the optical waveguide substrate and configured of a convex portion protruding in a thickness direction of the optical waveguide substrate and extending in a plane direction of the optical waveguide substrate; and
a light receiving element, configured of a light receiving part formed on a light receiving element substrate disposed on the rib type optical waveguide and configured to receive at least a part of light propagating through the rib type optical waveguide,
wherein the light receiving element substrate is supported by at least one first convex portion having the same height as that of the rib type optical waveguide provided on the optical waveguide substrate;
wherein at least one second convex portion is provided on the optical waveguide substrate at an input waveguide side of the light receiving part in a light propagation direction of the rib type optical waveguide.
2. The optical waveguide element according to claim 1, wherein
the second convex portion extends in the plane direction of the optical waveguide substrate, and
at both end portions thereof in an extending direction, a distance between one end portion facing the input waveguide side of the rib type optical waveguide and the rib type optical waveguide is configured to be smaller than a distance between the other end opposite to the one end portion and the rib type optical waveguide.

3. The optical waveguide element according to claim 2, wherein
the second convex portion has the same height as that of the rib type optical waveguide.

4. The optical waveguide element according to claim 2, wherein
at least one of the second convex portions is the first convex portion which supports the light receiving element substrate.

5. The optical waveguide element according to claim 1, wherein
the rib type optical waveguide is terminated at a lower portion of a light receiving range of the light receiving part.

6. The optical waveguide element according to claim 1, wherein
the light receiving element includes a plurality of light receiving parts provided on the light receiving element substrate, and
the light receiving element substrate is disposed at a position at which each of the plurality of light receiving parts receives a part of light propagating in each of a plurality of rib type optical waveguides different from each other.

7. An optical waveguide device, comprising:
the optical waveguide element according to claim 1;
a housing, configured to accommodate the optical waveguide element;
an input optical fiber, configured to cause light to be incident to the optical waveguide element; and
an output optical fiber, configured to guide output light emitted by the optical waveguide element to outside of the housing.

8. The optical waveguide device according to claim 7, wherein
a drive circuit which drives the optical waveguide element, or the drive circuit and a digital signal processor are provided inside the housing.

9. An optical transmission apparatus, comprising:
the optical waveguide device according to claim 8 in which the drive circuit is provided inside the housing; and
a digital signal processor, disposed outside the housing.

10. An optical waveguide element, comprising:
an optical waveguide substrate;
a rib type optical waveguide, provided on the optical waveguide substrate and configured of a convex portion protruding in a thickness direction of the optical waveguide substrate and extending in a plane direction of the optical waveguide substrate; and
a light receiving element, configured of a light receiving part formed on a light receiving element substrate disposed on the rib type optical waveguide and configured to receive at least a part of light propagating through the rib type optical waveguide,
wherein the light receiving element substrate is supported by at least one first convex portion having the same height as that of the rib type optical waveguide provided on the optical waveguide substrate;
wherein the optical waveguide substrate has a thickness of 5 μm or less.

11. The optical waveguide element according to claim 10, further comprising:
a second convex portion, being extended in the plane direction of the optical waveguide substrate, and
at both end portions thereof in an extending direction, a distance between one end portion facing an input waveguide side of the rib type optical waveguide and the rib type optical waveguide is configured to be smaller than a distance between the other end opposite to the one end portion and the rib type optical waveguide.

12. The optical waveguide element according to claim 11, wherein
the second convex portion has the same height as that of the rib type optical waveguide.

13. The optical waveguide element according to claim 12, wherein
at least one of the second convex portions is the first convex portion which supports the light receiving element substrate.

14. The optical waveguide element according to claim 10, wherein
the rib type optical waveguide is terminated at a lower portion of a light receiving range of the light receiving part.

15. The optical waveguide element according to claim 10, wherein
the light receiving element includes a plurality of light receiving parts provided on the light receiving element substrate, and
the light receiving element substrate is disposed at a position at which each of the plurality of light receiving parts receives a part of light propagating in each of a plurality of rib type optical waveguides different from each other.

* * * * *